J. J. Wilkins,

Harness Trimmings,

N° 55,942. Patented June 26, 1866.

Witnesses;
E. N. Doney
R. E. Eerabuk

Inventor;
J. J. Wilkins
By his Atty
W. C. Dodge

UNITED STATES PATENT OFFICE.

J. J. WILKINS, OF VIRDEN, ILLINOIS.

IMPROVED HARNESS-HOOK.

Specification forming part of Letters Patent No. 55,942, dated June 26, 1866.

*To all whom it may concern:*

Be it known that I, J. J. WILKINS, of Virden, in the county of Macoupin and State of Illinois, have invented certain new and useful Improvements in Pad-Hooks for Harness; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in constructing the body of the hook with a hole for a strap to pass through, and with ears projecting on each side for securing it, by means of rivets, to the strap.

Figure 1:
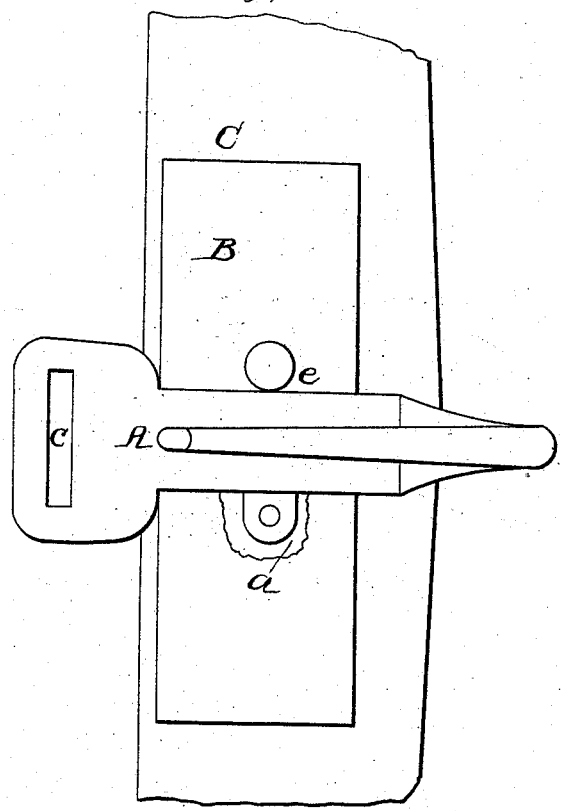
Figure 2:
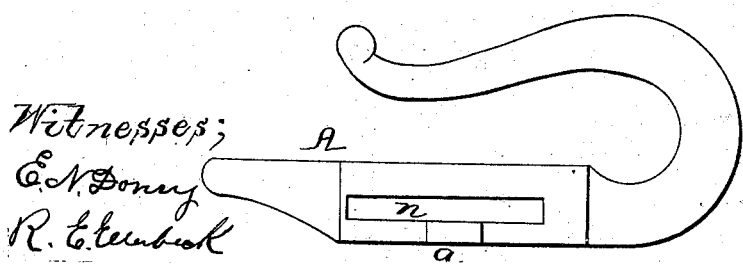

Figure 1 is a top-plan view, and Fig. 2 a side elevation.

A represents a pad-hook, which has its upper or curved portion constructed in the usual manner. Through the lower portion of the hook A a hole or mortise, $n$, is made, as shown in Fig. 2, and from the lower portion an ear or lug, $a$, projects horizontally on each side, as shown in Fig. 1, with holes to receive the rivets $e$.

To secure the hook to the harness a strap, B, is inserted through the hole $n$, and a rivet is then inserted through the holes in the ears $a$, and also through the strap B, thus securing the hook firmly to the strap B. The latter, with the hook attached, is then secured to the pad or back-strap C by the usual terrets, or in any other suitable manner.

By this manner of constructing and securing the hook it can be attached to a pad, or to a simple flat back-strap, without having any screw or other portion projecting through the pad or back-strap, and thus prevent the possibility of chafing or otherwise injuring the animal's back.

It is exceedingly cheap, simple, and efficient.

Having thus described my invention, what I claim is—

The hook A, provided with the transverse opening or hole $n$ and the horizontally-projecting ears $a$, constructed and operating as shown and described.

J. J. WILKINS.

Witnesses:
  WM. PERRINGS,
  GORDON EVANS.